(No Model.)
E. W. PRESBREY.
COMPOUND BLOW PIPE REGULATOR.
No. 438,488. Patented Oct. 14, 1890.
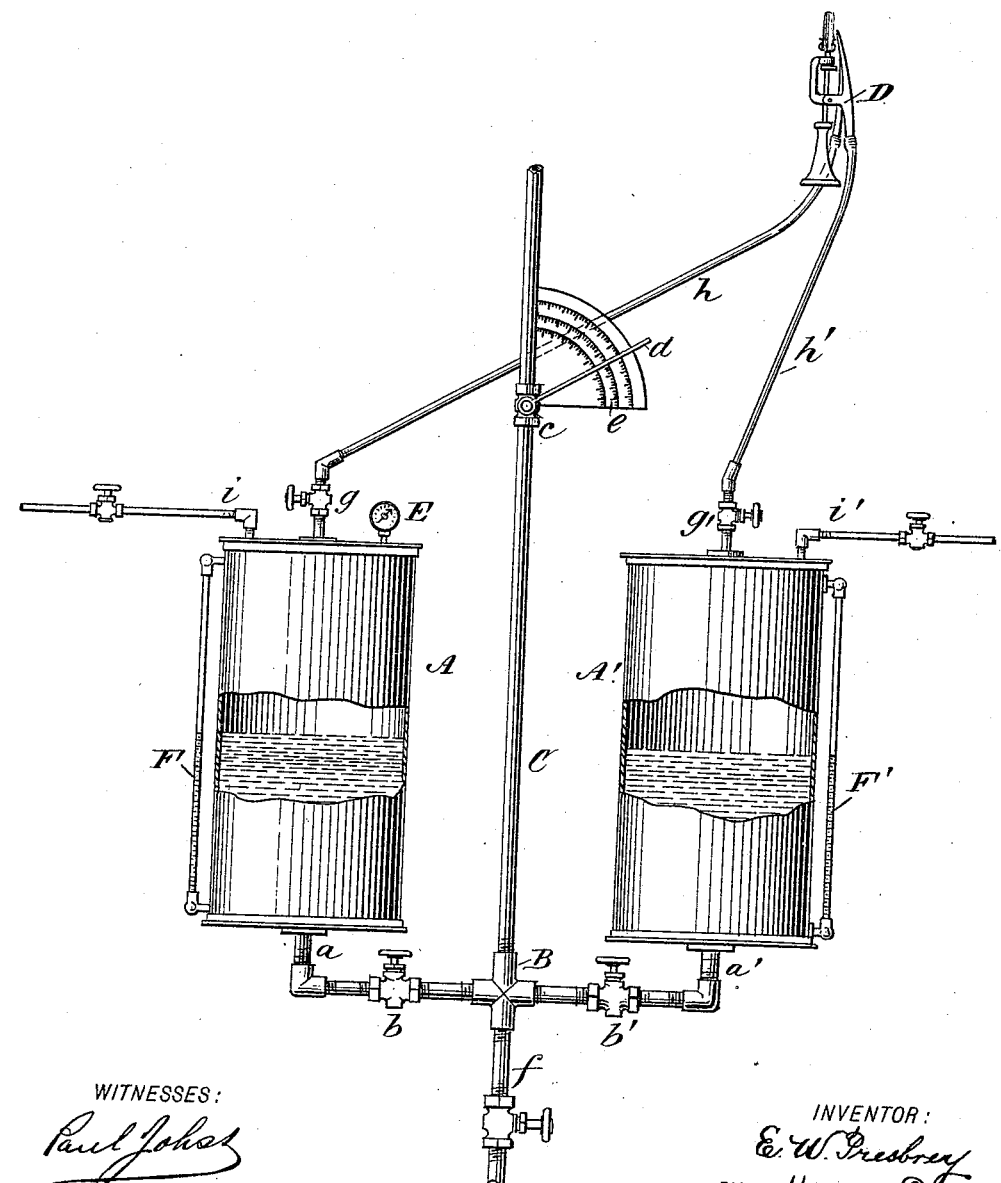

UNITED STATES PATENT OFFICE.

EUGENE W. PRESBREY, OF NEW YORK, N. Y.

COMPOUND-BLOW-PIPE REGULATOR.

SPECIFICATION forming part of Letters Patent No. 438,488, dated October 14, 1890.

Application filed January 20, 1890. Serial No. 337,532. (No model.)

*To all whom it may concern:*

Be it known that I, EUGENE W. PRESBREY, of New York city, in the county and State of New York, have invented a new and Improved Compound Blow-Pipe Regulator, of which the following is a specification, reference being had to the accompanying drawing, which is a side elevation, partly in section.

In using the oxyhydrogen blow-pipe it is essential that the gases should be supplied at a uniform and equal pressure in order that a fixed temperature may be maintained for a given time. Perfect combustion is secured in the oxyhydrogen blow-pipe by the use of two volumes of hydrogen and one volume of oxygen. Any other proportion will lessen the efficiency of the blow-pipe. Two ordinary gas cylinders or tanks of equal size—one containing oxygen at twenty-five pounds pressure, the other containing hydrogen at the same pressure—connected with a burner so regulated that the combustion should be perfect will fail to maintain an equal or uniform pressure, for the reason that the hydrogen flows twice as fast as the oxygen. There will therefore from this and other causes be a constant variation in the proportion of the hydrogen to the oxygen from the moment of ignition at the burner until the gases are exhausted. This variation of the pressure necessitates constant regulation of the flow of the gases at the burner.

The object of my invention is to obviate this difficulty and to provide a compound blow-pipe regulator which will maintain a uniform and continuous flow of the gases so long as the burner is in use, thereby producing a constant temperature in the burner and securing light of uniform intensity automatically.

My object is further to prevent any mixture of the two gases and to provide means whereby the regulator-tanks may be filled or emptied separately or together.

My invention is particularly designed for application to the illumination of stages in theaters, analogous uses, and for the compound blow-pipe when used in scientific operations.

My invention consists in the combination of two or more similar tanks with a common glycerine, water, or other liquid supply and discharge pipe attached to a connecting-pipe at the base of said tanks, valved pipes for supplying gases to the tanks, and valved pipes for conveying gases from the tanks to the burner.

The tanks A A' for receiving and storing the gases are preferably made of sheet metal. In the bottom of each of the tanks are inserted pipes $a$ $a'$, which are angled and provided with valves $b$ $b'$, connected with the cross-T B and the water-supply pipe C. The pipe C is provided with a plug-valve $c$, the plug of which is furnished with an arm $d$, which extends over a graduated quadrantal scale $e$. A valved discharge-pipe $f$ is inserted in the lower branch of the cross-T B. In the tops of the tanks A A' are inserted the valved pipes $g$ $g'$, which are connected by pipes $h$ $h'$ with the compound blow-pipe D. The tank A is furnished with a pressure-gage E, and both of the tanks are furnished with glass water-gages F, which serve to show the level of the liquid in the tank. In the tops of the tanks are inserted the valved supply-pipes $i$ $i'$, through which the tanks are filled with gas.

The valved pipes $g$ $g'$ being disconnected from the burner and opened to allow the escape of air from the tanks A A' water or other liquid is admitted to the tanks through the valve $c$, the pipe C and valves $b$ $b'$ thus displacing the air, which escapes through the valved pipes $g$ $g'$. These pipes are then closed. The valve $c$ is closed and the valved pipe $f$ is opened to allow water to escape.

The tanks are filled with their respective gases through the pipes $i$ $i'$ as the water is discharged. When the tanks are half-full of gas under pressure, the valved pipes $f$ and C are closed, the blow-pipe D is attached by means of the flexible pipes $h$ $h'$ to the valved pipes $g$ $g'$, and the gases will be supplied to the blow-pipe D under equal pressure from both of the tanks. As the tanks are in free communication with each other and with a common liquid seal, this uniform pressure will be maintained so long as the gases remain in the tanks. Any surplus of pressure in either tank will be transferred at once to the other tank through the liquid medium.

It is obviously not necessary that there should be the same volume of gas in each tank. The pressure of the gases will be the same whatever the variation of the volume, as the pressure balance is maintained by the liquid seal.

My improved apparatus may be operated upon any working pressure from the normal atmospheric pressure upward. I have found in practice that a pressure of twenty-five pounds to the square inch answers every requirement. The regulator may be supplied in many ways. Gas may be forced into it by a pump or by means of a gasometer or by hydraulic pressure properly adapted.

In practice, to secure perfect safety, I make the gas-tanks of double the capacity required for the storage or regulation of the gases and do not allow the water or other liquid to descend below the median line of the tanks, so that the tanks are never less than half filled with liquid. It is obvious that this arrangement prevents the mixture of the gases, inasmuch as all of the water must be transferred from one tank to the other before the gas can enter the pipes $a$ $a'$, and when the water is so transferred there will be no room for gas in the full tank.

Having thus described my invention, I claim as new and desire to secure by Letters Patent—

1. In an apparatus for supplying explosive gases to a burner and regulating the pressure thereof, the combination of two or more tanks, each tank having suitable gas inlet and outlet pipes and connected at their bases, a body of water or other liquid maintained in said tanks and the connection thereof, and a suitable supply and discharge pipe for the water or other liquid, substantially as described.

2. In an apparatus for supplying explosive gases to a burner and regulating the pressure thereof, the combination of two or more tanks, each tank having suitable valved gas inlet and outlet pipes, said tanks having a pipe-connection at their bases, a body of water or other liquid maintained in said tanks and the pipe-connection thereof, and valved liquid supply and discharge pipes, each connecting with the said pipe-connection between the tanks, substantially as described.

3. The method of supplying oxygen and hydrogen gases to a burner and regulating the pressure thereof, which consists in passing said gases into and through communicating vessels and placing and maintaining a constant volume of water or other liquid in the said vessels and in the communicating passage between the same, whereby a regular and equal flow and constant separation of the gases is insured and a constant pressure maintained at the burner, and also whereby an increase of pressure in one tank is communicated through the liquid seal to the gas in the other tank, substantially as described and set forth.

EUGENE W. PRESBREY.

Witnesses:
E. M. CLARK,
C. SEDGWICK.